Jan. 23, 1973 S. HOPFER 3,713,037

VARIABLE MICROWAVE ATTENUATOR

Filed Oct. 7, 1970 3 Sheets-Sheet 1

INVENTOR.
Samuel Hopfer
BY
Morton C. Jacobs
ATTORNEY

Jan. 23, 1973 S. HOPFER 3,713,037

VARIABLE MICROWAVE ATTENUATOR

Filed Oct. 7, 1970 3 Sheets-Sheet 2

INVENTOR.
Samuel Hopfer
BY Morton C. Jacobs
ATTORNEY

INVENTOR.
Samuel Hopfer
BY Morton C. Jacobs
ATTORNEY

United States Patent Office 3,713,037
Patented Jan. 23, 1973

3,713,037

VARIABLE MICROWAVE ATTENUATOR

Samuel Hopfer, Brooklyn, N.Y., assignor to General Microwave Corporation

Continuation-in-part of application Ser. No. 788,254, Dec. 31, 1968. This application Oct. 7, 1970, Ser. No. 78,891
Int. Cl. H01p 1/22
U.S. Cl. 333—81 A 17 Claims

ABSTRACT OF THE DISCLOSURE

A broadband microwave attenuator is formed by connecting a plurality of PIN diodes in a modified T network. Four semiconductor chips of PIN diode material are arranged in a flat layer sandwiched between conductors to form a strip-line configuration of a TEM transmission line, whereby the diodes are part of the line. This strip-line construction is used with outer diodes connected in series circuit relation between input and output terminals, and inner diodes in shunt relation to ground to form the T network. The diodes are constructed as silicon chips and are mounted in very close relation with a substantially uniform conductive strip forming the series-circuit connection between the central diodes and of a length which is small compared to the wavelength at high frequencies. Thereby, this connection is substantially lossless at low frequencies, and maintains the characteristic impedance of the line at high operating frequencies. Bias signals are supplied to the outer and inner diodes via conically spiral resistive conductors that form broadband, reflectionless, non-absorbing connections. The conical spiral conductor serves as a single-wire transmission line having a high impedance to high-frequency signals over a broad band carried by an r-f transmission line and serves as an effective coupling to such an r-f line.

BACKGROUND OF THE INVENTION

This invention relates to wideband microwave attenuators and particularly to a wideband voltage controlled microwave attenuator employing semiconductor elements such as PIN diodes, and to coupling devices usable in such attenuators.

This application is a continuation-in-part of copending application Ser. No. 788,254, filed Dec. 31, 1968, now abandoned having the same applicant and assignee as the present application, and describing forms of such attenuators and coupling devices.

A circuit designer synthesizing low frequency circuits may employ devices designated resistor, capacitor, inductor without questioning these designations. As a circuit's operating range is extended into the megahertz region and into gigahertz, complex impedance characteristics of these elements become significant and must be considered. When a circuit is designed in the microwave region each circuit element must be considered as a complex network. The task of constructing the circuit which can equivalently be represented by a resistance that remains substantially constant in value over a wide band of frequencies in the microwave region becomes a sophisticated problem.

Diodes have been arranged in mesh configurations as variable attenuators with D-C (direct current) bias applied to the diodes to vary their dynamic impedance for adjusting the attenuation levels. When such mesh circuits are operated at low frequencies, or even into the lower end of the microwave region, various reactive effects are minor and a two-port symmetrical attenuator can be operated with a characteristic impedance which is generally constant and equal to that of the transmission system.

However, at higher microwave frequencies, phase changes along connecting lines become significantly large, as do reactive effects of the diodes. As the frequency becomes higher (e.g. to gigahertz), compensation for these phase-distorting effects becomes more important. One approach for such compensation involves the use of small dimensions for various parts and connecting lines. However, such small dimensions, in turn, lead to other construction problems. A discussion of these problems, as well as solutions thereof, is set forth in the paper, "The T-Pi Configuration in the Design of Extremely Broadband PIN Attenuators" by Hopfer et al., 1968 Proc. NEC 308–313, which is incorporated herein by reference.

D-C blocking capacitors may be interspersed between the mesh diodes to isolate the effect of bias currents being applied to one diode from affecting the other diodes. These blocking capacitors may be effective at lower frequencies, but at higher frequencies they do not behave as lumped capacitances and thus impair the operation of such circuits.

Typically, D-C bias currents are applied to the diodes through inductive leads. Usually a coil serves as an adequate inductor to pass the D-C without loading the circuit. When the circuit must be operated in the microwave region, however, a coil ceases to be an inductor but rather tends to be a parallel tuned circuit at some frequency, and yet at higher frequencies the capacity between the turns may predominate and effectively render a conventional coil a capacitor rather than an inductor.

SUMMARY OF THE INVENTION

Therefore, it is an object of this invention to provide a wideband voltage-controlled microwave attenuator.

It is another object of this invention to provide a voltage-controlled microwave attenuator which has a substantially uniform characteristic over a wide frequency band.

Another object is to provide a coupling network for applying low frequency signals to a microwave structure.

Another object is to provide a wideband voltage-controlled attenuator in which bias currents are applied to diodes through elements having high impedance characteristics throughout a broad microwave spectrum.

In the aforementioned copending application, Ser. No. 788,254, one form of the invention is described utilizing encapsulated PIN diodes having a diameter of the order of one-tenth of an inch. An object of the present form of the invention is to provide a miniaturized construction in which the diode elements have a diameter of the order of one to two-hundredths of an inch, or less.

In accordance with one form of the invention described hereinafter, a wideband attenuator is constructed using four diode chips, two of which are effectively connected in series and two in shunt to provide a T network. By supplying direct bias currents to the diodes, the effective series and shunt resistances may be varied to produce variable attenuation. The four diodes are arranged in a plane and connected in a flat layer sandwiched between conductive electrodes on opposite faces. One such electrode is arranged along one face of the diodes corresponding to the same electrode thereof. Separate electrodes are connected to the opposite faces of the outer diodes, and a common ground-plane electrode is connected to the opposite faces of the inner diodes. This diode assembly is constructed as a strip transmission line in which the PIN diodes are part of the transmission line. The assembly is mounted in a suitable housing with the separate electrodes of the outer diodes respectively connected to input and output connectors. The electrode connection between the inner diodes is a substantially uniform strip which is lossless at low operating frequencies, and at high operating frequencies in the gigahertz range, it maintains the characteristic impedance of the line. Thereby, the operating frequencies of the attenuator tend to be extended to provide a substantially uniform characteristic over a wide frequency band.

A conical, spiral conductor serves as a single-wire transmission line for coupling bias signals to the diodes. The single-wire line has a relatively low impedance to the low frequency bias signals and a high impedance to radio frequency signals over a broad band carried by the attenuator.

A trough-line structure in the form of a hollow waveguide encloses a TEM microstrip line having the conical spiral coupling connected thereto whereby propagation within the waveguide is restricted to the single TEM mode.

BRIEF DESCRIPTION OF THE DRAWING

The foregoing and other objects of this invention, the various features thereof, as well as the invention itself, may be more fully understood from the following description when read together with the accompanying drawing, in which.

In the drawings, corresponding parts are referenced by similar numerals throughout.

DESCRIPTION OF A PREFERRED EMBODIMENT

Figure 1:
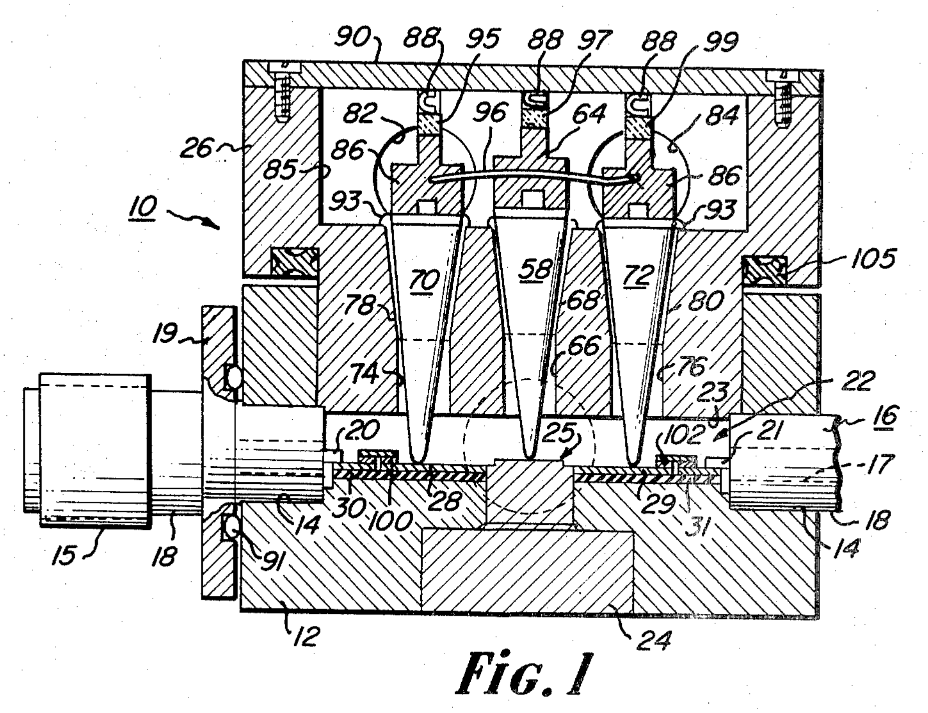
FIG. 1 is a sectional view in elevation of an attenuator unit embodying this invention.

In FIG. 1, the attenuator unit 10 is constructed with a housing of electrically conductive material such as aluminum. The housing is generally rectangular and symmetrical and includes a bottom block 12 of generally rectangular outer shape and having aligned circular openings 14 in opposite faces, in which are mounted coaxial connectors 15 and 16 having an outer conductor 18 and a central conductor 17 (part of the connector 16 is omitted from FIG. 1 for simplicity of illustration). A mounting plate 19 secured to the connector 15 is used to fasten the latter to the block.

The block 12 has a generally rectangular inner opening 22 formed between the inner and outer openings 14, and which is enclosed from the top by the lower face of a block 26 inserted within block 12. A stud 24 of generally circular form is inserted through a similarly shaped opening in the lower wall of block 12 and is centrally and symmetrically located between the ports 15 and 16. The stud carries on its upper face, which enters the opening 22, a diode network 25 illustrated in greatly enlarged form in FIGS. 2 and 3. The stud 24 serves as part of a ground plane for this network, and is preferably formed of a conductive material such as tellurium copper, which has a gold plating 27 (FIG. 2) for good electrical connections; a nickel plating under the gold serves as a barrier against diffusion of the gold into the copper and also is a good thermal conductor to carry heat energy away from the diode network.

The portions 20 and 21 of the central conductors projecting into the region 22 serve as a transition between the coaxial waveguide of the connectors 15 and 16 at each port and the strip-line form of TEM transmission line located within the opening 22. The strip-line has a ground plane formed by the upper surface of the aluminum block 12 which is in direct electrical contact with the outer coaxial conductor 18, which in use is normally a reference or ground connection. The strip-line at one port includes a dielectrical layer 30, such as Teflon, in the form of a rectangular strip between the ground-plane block 12 and a thin, rectangular- copper strip 28 which overlies the dielectric and is directly connected to the central conductor 20 of one port. A similar copper strip 29 overlies a similar dielectric layer 31 at the other port thereof and is connected to the center conductor 21 of the other port's connector 16.

The center stud 24 is cut away at its upper end (FIG. 2) to form a smaller, circular throat portion 34 with a chamfered rim 48, and on the surrounding shoulder 36 a dielectric ring 38, such as beryllia, is mounted. The elements are dimensioned so that the top surface of the ring 38 is at the same level as the top surface of the copper strips 28 and 29; and radially extending over, and in direct contact with, the latter strips and the beryllia ring on each side are gold strip-line ribbons 40 and 41.

The top of the throat portion 34 of the center stud 24 is at substantially the same level as the top surface of the strip-line ribbons 40 and 41. Two outer diodes 42 and 43 respectively rest on the ribbons 40 and 41, and two inner diodes 44 and 45 rest on the upper throat portion 34 of stud 24. A dielectric block 46, such as Kapton, is located between the center diodes 44 and 45 and likewise rests on the throat 34 at the center thereof. The tops (e.g. the anodes) of all of the diodes 42–45 and of the center block 46 are at substantially the same level, and secured to those electrodes is a gold strip-line ribbon 50 which is generally uniform in thickness and in transverse width, for its electrical characteristics; a central portion 52 (FIG. 3) of this ribbon is somewhat wider for its mechanical, structural function as a bearing surface, as hereinafter described, but without effect on its electrical characteristics. The chamfered outer rim 48 of the top section of the throat 34 provides a substantial electrical spacing between the inner ends of strips 40 and 41 and the top conductive surface 27 of stud 24.

Resting on the center of strip 52 is the circular tip 54 of a metallic cone 56 which functions as a contact and which is secured to a cone 58 of dielectric material (such as rexolite) as the lower tip thereof. Formed around the conical surface of cone 58 is a helical groove 60, and inserted fully therein is a resistive wire (e.g. nickel) 62, which wire at its lower end is secured to the metal contact 56, and at its upper end is attached to a generally cylindrical metal contact 64 (FIG. 1) which sits on top of the dielectric cone 58. The conical metal tip 56 is employed for the extremely small contact radius of about 0.01 inch or less; alternatively, the dielectric cone 58 may be formed with a conical tip having a metallic contacting coating connected to the spiral wire 62.

The upper block 26 of the housing has a cylindrical central hole 66 through which the lower portion of cone 58 passes. The passage 66 communicates with a counterbore opening 68 which generally mates with the outer surface of the cone 58 and supports the upper portion thereof. Thus the cone 58 is retained within the parallel conical opening 68 through a good portion of its length, and the cylindrical passage 66 provides a gradual transition in spacing between the wire 62 and grounded block 26.

Figure 4:
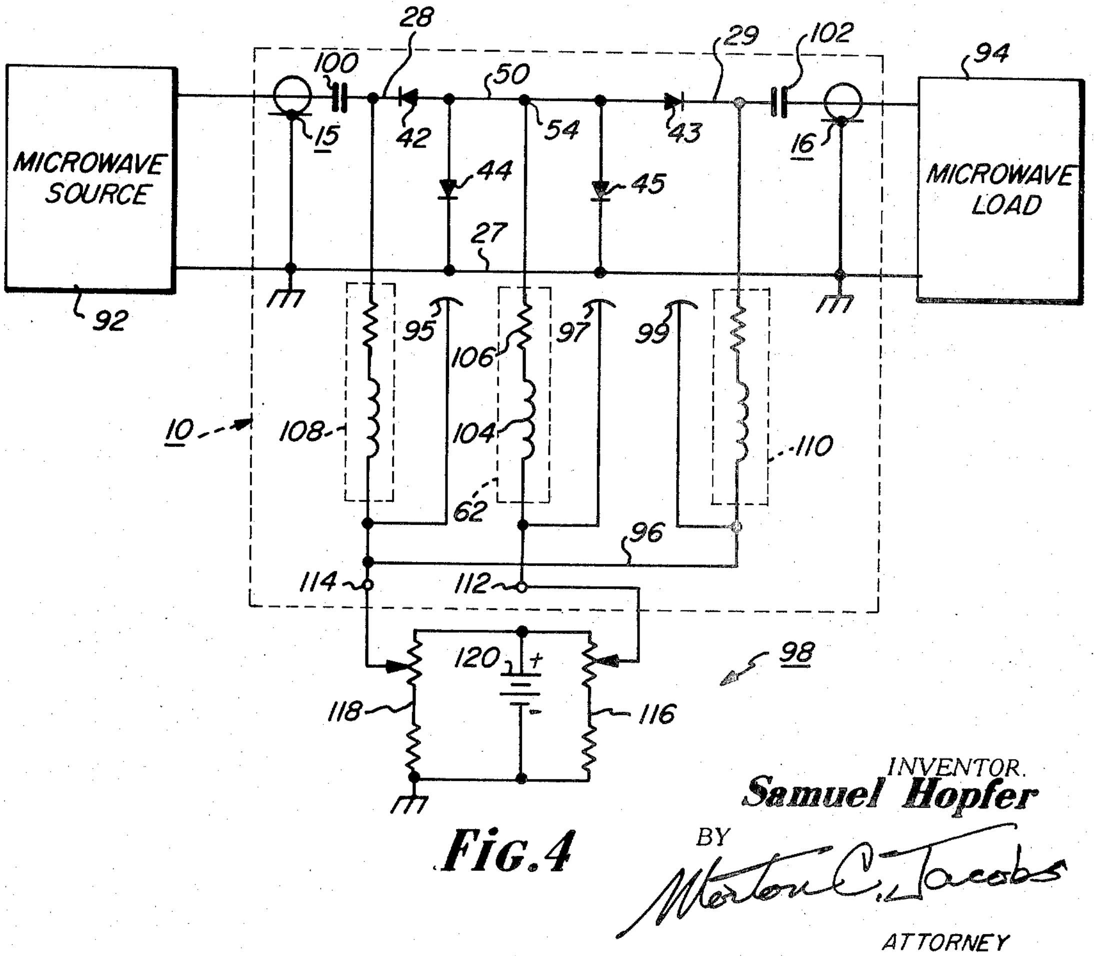
FIG. 4 is an equivalent schematic circuit diagram of the attenuator unit of FIG. 1.

The other cones 70 and 72 (FIG. 1) are constructed and wound with wires similarly to cone 58. Cones 70 and 72 are located in cylindrical openings 74 and 76 on opposite sides of the central opening 66 and aligned in a straight line therewith. Similar conical counterbore openings 78 and 80 respectively connect with the upper portions of the cylindrical openings 74 and 76. The counterbore openings 78 and 80 are similar, but have somewhat greater depth than the central counterbore opening 68 so that the cones 70 and 72 extend deeper (e.g. about 0.005 inch) into the central opening 22 and the metal contact tips thereof rest on the copper strip-line portions 28 and 29, which are at a lower level than strip 50, corresponding to about the thickness of the diodes 42–45, as may be seen in FIG. 2. Two transverse openings 82 and 84 in the upper block 28 pass into an upper rectangular opening 85 in block 26 into which the upper portions of the cones extend. The openings 82, 84 provide passage for two connectors (not shown) that are connected to the wires of the cones; one such connector (having a terminal 112 as indicated in the equivalent circuit of FIG. 4) is connected to the contact 64 of the central cone, and the other connector (terminal 114) is connected to one of the similar contacts 86 on the top of the other cones 70 and 72. A bypass capacitor 95, 97, 99 is respectively connected between the upper end of the spirals on each of the cones 70, 58 and 72 and the ground plane of the aluminum housing. Ceramic capacitors are used, and each is secured on the top of the metal contacts 64 and 86 and electrically connected in position by means of metallic C-springs 88 pressed between the respective capacitor and the cover plate 90. A wire 96 interconnects the contacts 86 of the outer cones; other wires connect one of the latter contacts and the central contact to the terminals 114 and 112, respectively (FIG. 4). Each of the cones 58, 70 and 72 is fastened to and sealed in the upper block 26 by means of a flexible epoxy or silicone rubber in the form of a separate ring 93 adjacent the upper rim of each of these cones. The resilience in this adhesive 93 is such that when the block 26 is inserted in the block 12, and the lower tips of the cones engage the respective contact points on ribbon 50 and ribbons 28 and 29, the adhesive permits a slight upward movement of the cones caused by the pressure of engagement at the contact points. The dimensions are so chosen that such movement of the cones results in sufficient pressure being achieved in the mounting of the cones, and the resiliency of the adhesive 93 ensures that good electrical contact at the lower tips 56 is achieved. The center passage 22 of the housing is additionally sealed, when the unit is assembled, by means of resilient O-rings 91 at the mounting plates 19 and a quad-ring 105 between the upper and lower blocks 26 and 12.

Each PIN diode 42–45 is a semiconductor element having a double-diffused junction consisting of P and N regions separated by a thin layer of undoped or intrinsic (I) semiconductors; the intrinsic layer may be sharply defined if fabricated epitaxially, or it may be ill-defined due to diffusion. In its forward-biased state, the PIN diode, it is known, behaves as a resistive element over a wide range of microwave spectrum. The dynamic resistance between its two electrodes is controllable by a bias current (which may be D-C or at audio or video frequencies) to change, for example, from about 10,000 ohms to 1 or 2 ohms. The dynamic resistance is substantially independent of frequency so long as the period of the signal is short relative to the lifetime of the minority carriers in the semiconductor.

There are no sharp upper or lower frequency limits in the microwave region beyond which the PIN diode ceases to function as a controllable resistive element, and they have been used to 18 gigahertz and above. PIN diodes have associated parasitic reactances which produce deviations from their resistive nature at the high frequency end of the microwave spectrum.

The chips are fabricated with a gold terminal at the top (which may be the anode or cathode and which illustratively is the anode) surface and with a thin layer of gold solder at the bottom surface, whereby good electrical connections are formed (e.g. by welding or thermocompression bonding) with the gold conductors 27, 40, 41, 50 in the strip-line construction. The square diode chips typically are about 0.015 to 0.020 inch long on a side and about 0.005 inch thick. The PIN diode chips 42–45 are illustrated (FIG. 2) with their upper corners etched away, which construction serves to reduce the capacitance between the diode electrodes.

Figure 2:
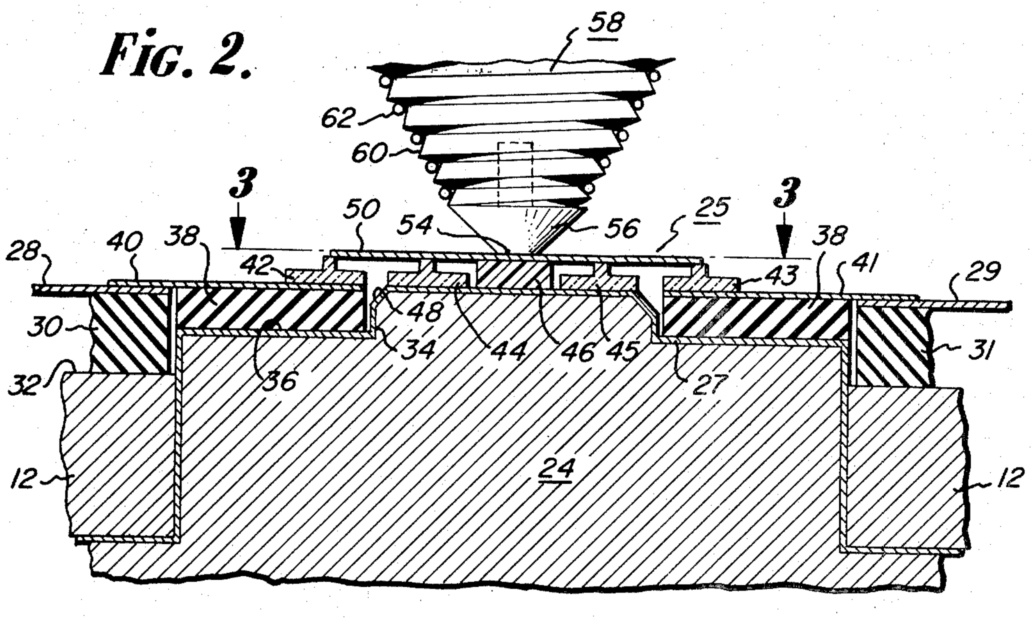
FIG. 2 is a greatly enlarged view of the encircled portion of FIG. 1 and is a sectional view corresponding thereto.
Figure 3:
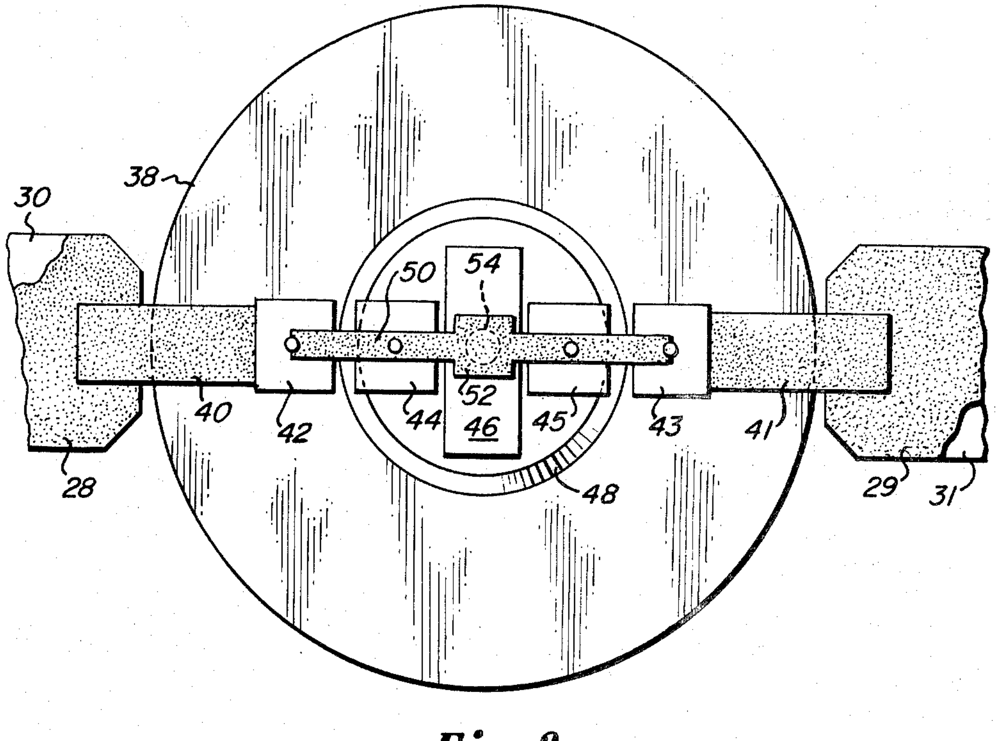
FIG. 3 is a top plan view taken along the line 3—3 of FIG. 2.

The schematic circuit diagram of FIG. 4 illustrates in the broken-line box 10 an equivalent circuit diagram of the attenuator unit of FIGS. 1–3, and shows the connection of the unit 10 to an appropriate source 92 of microwave signals (e.g. in the broad band of 0.1 to 18 gHz.) via the input port 15, and to a microwave load 94 via the output port 16. Biasing is supplied to the unit 10 by means of circuits 98. Blocking capacitors 100 and 102 are provided in the input and output sections of the unit by any appropriate means; for example, a dielectric element (a chip of barium titanate) may be inserted in a break in the strips 28 and 29 as shown in FIG. 1 (or inserted in a break in the central conductor of the connectors 15 and 16 in a manner known in the art). For example, as indicated in FIG. 1, it has been found suitable to form a break of about 0.003 inch in each strip 28 and 29 and on top of these strips 28 and 29 a dielectric chip 100 and 102 is set and an overlay 103, 105 of gold ribbon is used to bridge the breaks.

The equivalent circuit may be traced from the central conductor 20 of the input port 15 via capacitor 100 and the conductive strips 28 and 40 to the cathode of series diode 42, the anode of which is in electrical contact with the ribbon strip 50, as are the anodes of the other diodes 43–45. The cathode of diode 43 is connected via the conductive strips 41 and 29 and capacitor 102 to central conductor 20 of port 16. The cathodes of shunt diodes 44 and 45 are connected to the ground plane of gold plating 27 at the top surface of the stud throat 34. The wire 62 of the central cone 58 has a direct electrical connection to the center of the gold ribbon 50, and electrically it has a substantial inductance 104 produced by the multi-turn conical format, and a substantial resistance 106 due to the use of a resistive nickel wire, as explained below. The wires 108 and 110 (FIG. 4) encircling the cones 70 and 72 are similarly characterized by a substantial inductance and resistance. The wires 108, 62 and 110 are coupled by the ceramic capacitors 95, 97 and 99, respectively, which serve to bypass the R-F to ground.

Terminal connectors 112 and 114 (inserted via openings 82 and 84 in the upper block 26) are respectively connected to potentiometers 116 and 118, which are energized by battery 120. Thereby, a biasing current supplied to the anode 54 between the shunt diodes 44 and 45 may be varied separately from the direct current bias supplied to the cathodes of the series diodes 42 and 43.

The operation may be summarized as follows: The variation of the bias supplied across each of the diodes effectively modifies the operating characteristic of the diode to a different portion of the nonlinear resistive characteristic thereof. With the resistances of the series and shunt diodes varied, the overall attenuation of the unit 10 is varied. For example, with an extremely large resistance in series diodes 42 and 43 and a relatively small resistance in shunt diodes 44 and 45, the unit has an overall high attenuation. Similarly, when the resistance of the shunt diodes is extremely large, and that of the series diodes small, the overall attenuation is small. Between those two extremes of attenuation, variations in attenuation may be achieved by intermediate levels of bias current. The unit may be operated between the two extreme levels of attenuation in the manner of an on-off switch; or, alternatively, it may be operated at various intermediate levels corresponding to variations in the bias current supplied to the diodes. However, an additional constraint is that the impedance of the transmission line must be maintained at the characteristic impedance (see, e.g., the book "Reference Data, ITT Handbook," 4th ed., p. 255, Symmetrical T and H Attenuators).

A microwave signal from the source 92 is applied to the input connector 15, which applies the signal via capacitor 100 to the cathode of the series diode 42. Part of the signal is dropped across the series diode 42, depending on its effective impedance, resulting in an attenuated signal applied across the shunt diodes 44 and 45. The amplitude of this microwave signal across the shunt diodes is determined by the ratio of the dynamic impedance of the series diode 42 and the dynamic impedance of the combination of the two shunt diodes 44 and 45 in parallel with each other and with the series combination of series diode 43 and the impedance of the load 94 that is connected to output connector 16. The attenuated microwave signal is further reduced in amplitude by the voltage dividing effect of the diode 43 in series with the terminating impedance of load 94. Thus the degree of attenuation provided by the attenuator circuit 10 is determined by the dynamic impedances of the diodes 42–45, and these impedances are determined in turn by the bias currents flowing therethrough in accordance with the known impedance characteristics of the diodes.

Bias currents are fed to the diodes 42–45 through the low-pass filter networks 104, 108 and 110 and directly to the conductors 50, 28 and 29, respectively. These low-pass filter networks 108, 104 and 110 are connected to the cathode of series diode 42, the center strip 52 of strip 50 at the junction of the anodes of diodes 42–45, and the cathode of series diode 43, respectively. Being connected to the microwave signal path, these low-pass filter networks are designed to exhibit a high impedance to the microwave signal so as not to load that signal, but yet exhibit a low impedance to the bias signals applied to the diodes. For example, if the microwave signal to be passed by the attenuator circuit 10 has components in the frequency band between 50 megahertz and 18 gigahertz (a bandwidth for which the unit 10 may be used), while the bias currents represent a video signal having a spectrum between D-C and 4 megahertz, the low-pass filter networks 31, 32 and 33 would have low impedances from D-C to 4 megahertz, and high impedances from 50 megahertz to 18 gigahertz.

The bias circuit 98 is one form of circuit that may be used for applying the bias currents. The potentiometers 116 and 118 serve as low-impedance, constant voltage sources and they are varied to establish (with the fixed resistances 106 of the networks 62, 108 and 110) the series and shunt bias currents, which vary typically from about zero to 100 milliamperes to vary the R-F resistances of the diodes continuously from about 1,000 to 5 ohms or less. Other adjustable current sources, including various voltage controlled current sources, may be employed in their place. With appropriate selections of bias currents, a wide range of continuously variable attenuations from substantially zero up to about 40, 60 or 90 db may be attained with a single unit for different modes of operation. These modes include bilaterally-matched, unilaterally-matched and unmatched, with lower attenuations being achieved for higher degrees of matching. In addition, the circuit may be rapidly switched between any two fixed values of attenuation in a fraction of a millisecond by means of voltage-controlled (e.g. transistor-controlled) sources of bias current. The circuit may also be operated as a switch between extreme attenuation levels.

The shunt diodes 44 and 45 are formed as part of the strip transmission line. That is, the dimensions of the gold ribbon 50 and the width and thickness of the semiconductor chips 44 and 45 are chosen so that an average characteristic impedance is achieved over the length of the line. For example, the dielectric constant of silicon (the principal material of the semiconductor) is 14, and the overall dimensions and spacing of the diodes are so chosen that an appropriate effective dielectric constant (e.g. about 10) is achieved, to provide a transmission line having the desired (e.g. 50-ohm) characteristic impedance.

In one embodiment, the ribbon strip 50 is dimensioned to have a width of about 0.006 inch in the regions overlapping the diodes, which have a width of 0.015 to 0.020 inch. The strip 50 is slightly widened at its central portion 46 overlying the dielectric block 48 to provide a larger area for effective contact with the tip 54 of the contact 56. The dielectric of bearing block 48 (for example, by use of Kapton for its material) is chosen to maintain the 50-ohm characteristic impedance in that region; its dimensions (somewhat enlarged, as shown) are chosen to maintain that characteristic impedance in the center of the strip line. Thus, by proper choice of dimensions, the diode chips 44 and 45 become part of the transmission line itself, which tends to compensate for the shunt capacitance across these diodes. Thereby, the characteristic impedance of the transmission line is preserved by the choice of dimensions and dielectric materials, and by the effects of the various parts thereof which in combined effect approximate the average of the various parts. In general, the dimensions chosen are small with respect to wavelength at high operating frequencies. However, the ribbon 50 between the shunt diodes 44 and 45 may be somewhat extra long for reasons discussed in the above cited Hopfer paper and particularly in accordance with the criterion of Equation 13 thereof. At low operating frequencies, the diodes 44 and 45 are effectively in parallel and serve as a single resistive impedance. At high frequencies the network of ribbon 50 and diodes 44 and 45 maintains the characteristic impedance of the line, so that the unit operates overall as a 50-ohm effective line for operation in a matched condition. Where the performance at zero insertion loss indicates excess shunt capacitance due to the shunt diodes, the line section interconnecting those diodes may be designed to have somewhat greater impedance to compensate; alternatively, the interconnecting line section may simply be a 50-ohm line.

The series diodes 42 and 43 do not introduce a large bypass capacitance relative to the 50-ohm characteristic impedance of the transmission line and of the overall unit 10; the series diodes are assembled in the strip-line structure to avoid the introduction of undesirable capacitance. The diodes 42–45 are assembled in a flat layer between the plane of the ribbon strip 50 and that of the strips 40 and 41 and ground-plane plating 27. Thus, a flat structure is provided in which the conductive strips that form the transmission line are maintained in corresponding planes. There are no significant bends in the signal plane; the out-of-plane variations occur in the ground plane of stud 24 and block 12. This construction avoids any leakage capacitances which would result from bends in the strip 50 which connects the diodes or in the other strips and which would lead to bypassing of signals such as to prevent the desired uniform response over the bandwidth.

The use of particular materials and the flat structure of the strip line is effective for thermal dissipation of the energy dissipated within the attenuating diodes. The beryllia used for the dielectric ring 38 has a low thermal resistance and is effective to carry away heat generated in the series diodes 42 and 43. The nickel plating over the copper stud 24 and underlying the gold plating 27 is effective by reason of its low thermal resistance for carrying away heat generated in the shunt diodes and that transmitted by the beryllia ring 38. The heat received by the stud 24 is transmitted to the aluminum housing block 12, which is effective both as a sink and as a transmitter of heat. Thereby, overheating of the resistive diodes 42–45 due to the heat generated with the attenuation of the electrical energy is avoided.

In general, the dimensions are chosen to provide extremely small lead lengths so as to minimize the resulting inductive effects of electrical connections at the very high frequencies (e.g. up to 18 gigahertz). The planar stripline construction is effective to reduce the conductor lengths associated with the shunt diodes 44 and 45 to generally negligible amounts. This construction avoids substantial shunt inductances at high frequencies which would otherwise tend to limit a high attenuation that might be achieved. Moreover, the structuring of the unit so that its elements are generally enclosed within the strip transmission line tends to maintain a uniform characteristic impedance over the broad frequency range.

Figure 7:
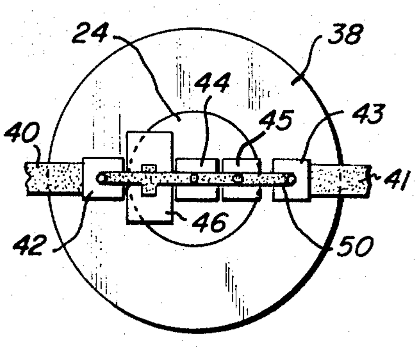
FIGS. 7, 8, 9 and 10 are top views similar in orientation to that of FIG. 3, illustrating modified forms of this invention.

A modified form of the invention is shown in FIG. 7, which is a top view of the diode network construction similar to that of FIG. 3, and in which parts corresponding to those shown in FIG. 3 are referenced by the same numerals. As shown in FIG. 7, the shunt diodes 44 and 45 are located adjacent each other, and the Kapton block 46 is located between either series diode, say 42, and the adjacent shunt diode 44. Thus the conical spiral is connected to the ribbon strip 50 at a point (which is supported by the Kapton block) between the series and shunt diodes 42 and 44, respectively. The D-C or low frequency bias signals can be supplied with substantially equal effectiveness to the strip 50 at any point thereon (since the entire strip is a nodal point), and there is no substantial difference in the effect of the bias signals on the diodes by the modified arrangement in FIG. 7. However, with respect to the shunt diodes 44 and 45, the spacing between those diodes, and thereby the length of strip 50 therebetween, can be dimensioned in accordance with equation 13 of the aforementioned paper of applicant, or otherwise as desired (for example, the shunt diodes may be connected simply by a transmission line of characteristic impedance, namely, 50 ohms, and its length determined by the Equation 13 criterion). Thus, since the Kapton block 46 need not be located between the shunt diodes, the dimensions of the spacing between those diodes in the arrangement can be chosen without any restriction which would be imposed by the size of the contact tip 54 (e.g. about 0.01 inch).

Figure 8:
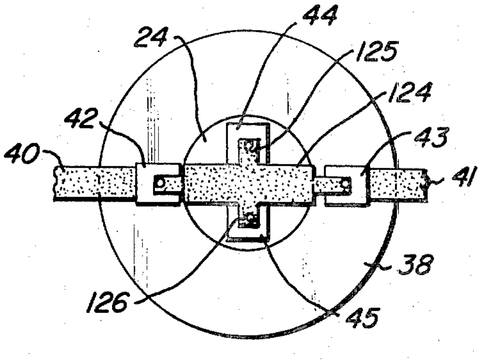

As shown in the modification of FIG. 8, the series diodes 42 and 43 may be connected by a 50-ohm transmission line formed by a relatively wide gold ribbon 124 and an appropriate dielectric, such as Kapton, between that ribbon and the ground plane 27. The shunt diodes 44 and 45 are coplanar with series diodes 42 and 43 and are located on either side of the transmission line formed by the ribbon strip 124, and are connected to that ribbon strip by appropriate transverse gold strips 125 and 126. The contact tip 54 of the spiral line 62 may be made at a convenient point along ribbon 124. As shown in FIG. 8, the shunt diodes 44 and 45 may be both located at the same intermediate position between series diodes 42 and 43, and thereby these shunt diodes are connected precisely in parallel at all operating frequencies. The diodes may be both at the mid-point position or displaced from this mid-point position in the direction of either series dode 42 or 43, and by equal amounts or unequally, and they may also be displaced in opposite directions as desired. The length of the electrical connection 125, 126 between the shunt diodes may be chosen in accordance with the criterion of the aforementioned Equation 13 or otherwise.

Figure 9:
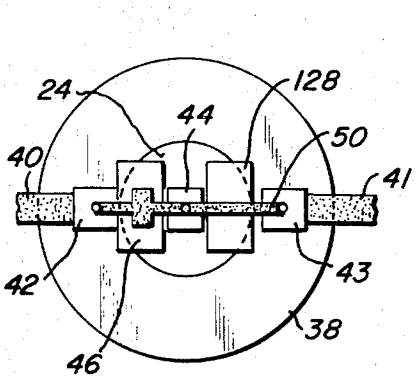

In the modification of FIG. 9, but a single shunt diode 44 is employed, coplanar with the series diodes, and is preferably located midway between them. The contact tip 54 engages ribbon 50 at a point supported by a Kapton block 46 to one side of the shunt diode 44, and a similar block 128 is provided to the other side in symmetrical relation. Generally, the current carrying capacity of a single shunt diode is about twice that of each series diode.

Figure 10:
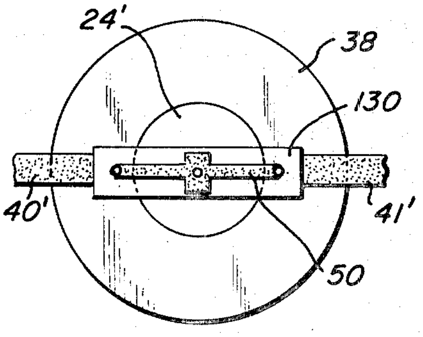

The arrangements shown in FIGS. 7, 8 and 9 have advantages similar to those described above with respect to the arrangement of the diodes shown in FIGS. 2 and 3. For example, all four diodes in the arrangements of FIGS. 7 and 8 (and the three in FIG. 9) are in the same plane, and can thereby be readily sandwiched between the single nodal electrode on one face of the diodes and the three electrodes on the opposite face, as described above with respect to FIG. 2. Due to the planar construction of the diodes, the unit can be fabricated from a single chip or block 130 of silicon, appropriately prepared or doped to form PIN diode material as shown in FIGS. 10 (a top view) and 11 (a sectional view through the long central axis of the block).

Figure 11:
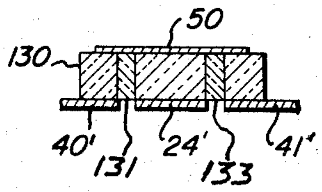
FIG. 11 is a sectional view of a portion of FIG. 10, taken along the horizontal diameter of the circular member therein.

The block 130 may take any suitable shape, such as rectangular. The diffusion of N-type material into the block is in three spaced regions separated by regions 131 and 133 from which the N material is generally excluded, for example, by masking them during the N diffusion. The P-type material is infused down to the I layer of the block at four discrete points along the length of the block to form four diode paths within the block (e.g. these points may be spaced about 0.015 inch apart to form diode paths of dimensions similar to those of the discrete chips of FIG. 3) or at three such points if but a single shunt diode is desired. Where four diode paths are formed, the points for the center two paths may be spaced in accordance with the criterion of the aforementioned Equation 13 or otherwise. Also, these two shunt diode paths may be further separated by masking the N diffusion from the central region in a manner similar to regions 131 and 133. With such a block, the separate diode paths are connected in the network by providing a common electrode 50 (in the form of a ribbon or metallic deposition) on one face of the block and three spaced electrodes 30', 24', 41' (in the form of ribbons or metallic depositions) on the opposite face of the block, corresponding to electrodes 40 and 41 for the series diodes and ground plane electrode 24 for the shunt diodes. The contact tip 54 of spiral 62 can engage the center of electrode 50 in the manner described above. The construction of FIGS. 10 and 11 provides a substantially uniform dielectric for the transmission line that incorporates the diode paths.

Thus, the attenuator network in each of the embodiments of FIGS. 3 and 7–10 is constructed with the semiconductor material of the diode paths forming part of the dielectric of the microstrip transmission line so that the characteristic impedance is preserved for operation in the matched condition. The shunt diodes do not introduce excess capacitance into the system, and any such capacitance that exists by reason of the diode construction can be readily compensated.

Figure 5:
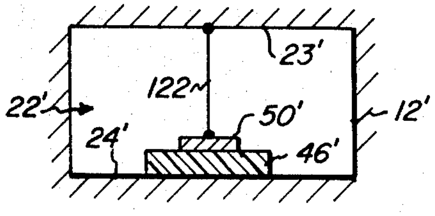
FIG. 5 is a simplified sectional view of a trough-line structure similar to the structure of FIG. 1 except with a straight line coupling conductor instead of a conical helix; the section corresponding to one at right angles to FIGS. 2 and 3.

The conical spiral wires 62, 108 and 110, as indicated above, are used to supply a D-C or other relatively lower frequency signal into the strip-line structure at the central nodal region 50 and at adjacent points spaced from each other by a fraction of an inch. The conical spiral wires are designed so as not to introduce any disturbance to the radio frequency line over an extremely broad bandwidth. For example, a quarter wavelength stub can be effective to feed in a signal in this fashion, but it is limited in that the microwave bandwidth that can be attenuated is much less than twice the frequency determined by the stub dimensions. The use of a direct metal connection to the contact points would generally be equivalent to a low impedance path and cause large reflections; for example, FIG. 5 shows a cross-section of a TEM transmission line of the microstrip type (i.e. a signal strip 50' and ground plane 24' with dielectric 46' form the line and opposing ground plane 23' is effectively infinitely remote and carries negligible current). FIG. 5 is somewhat representative in simplified form (and viewed as a transverse medial section) of the microstrip line of FIG. 2, except that the spiral wire 62 of FIG. 2 is replaced by straight wire 122, and an opening (e.g. cylindrical-conical opening 66, 68) in top plane 23' for passing the coupling wire 122 is omitted. In FIG. 5, parts corresponding to those shown in FIGS. 1 and 2 are referenced by similar numerals with the addition of a prime (').

With the spiral, the looping around many times affords more length, and the non-periodic looping such as that on the cone 58 shown in FIG. 2 (or by an Archimedes spiral in a plane) avoids the resonances found in periodic structures, and therefore produces a broadband performance. The spiral looping develops an inductance in the nature of a coil, which is distributed inductance, and the length of the spiral is a distributed resistance. The spiral metal is very thin and the capacitance between each loop is small. There are many capacitances, but they are in series so that the net capacitance is but that of a single capacitance for the R-F signal. The input impedance for this spiral is the sum of the impedances of the individual loops, and the latter are determined by the reactive components. The R-F resistance of the spiral that is developed due to the skin effect may be quite large (e.g. 2000 to 4000 ohms), many times that of the characteristic impedance (50 ohms) of the microstrip line and many times that of a corresponding resistance wire (such as the wire 122 in FIG. 5) of length equal to the height of space 22 in the housing.

The D-C bias connections that are formed by the spiral wires 62, 108 and 110 are effectively shunt connections to the ground line (via the bypass capacitors 95, 97, 99 that isolate the R-F signal from the D-C source 120). It is therefore desirable that these shunt paths should not pass any large amount of R-F energy. If these shunt paths were purely reactive, there would be no absorption but large reflections could be induced, especially where the reactance was small compared to the 50-ohm impedance of the line. These large reflections would then be objectionable, and effectively would impair the characteristic impedance of the microstrip line. If such reactive shunt paths had a large impedance, they would nevertheless resonate at various frequencies, which would then produce the same low impedance effect. The ideal is for the spiral lines to have a high impedance, with some loss or absorption of R-F energy in the shunt lines so as to prevent or substantially reduce the inevitable resonances (in a bandwidth from megahertz to gigahertz where the frequency extremes may be in the ratio of 200 to 1). That is, the resistance of the spiral paths should not be so large as to lose bias power and produce excessive heat. On the other hand, the R-F resistance of the spiral should be large enough so that the suck-outs of the R-F signal (at repeated ¼ wavelengths) are small and substantially smoothed out. Thus, at a normal resonant frequency, where one might expect to have a 40 or 50% shunting of R-F energy, the actual absorption produced by the resistive spiral 62 is only 1 or 2%. That is, the ratio of the microstrip impedance of 50 ohms to the R-F resistance of 2000 (or up to 4000) ohms of the spiral corresponds to about 2%, which is about a tenth db.

The resistance of the spiral should preferably be from 20 to 40 times the characteristic impedance of the transmission line (about 10 times might be good enough for some purposes). Nickel has the desired resistive characteristic (a number of times greater than copper), and its overall length is chosen to be sufficiently great for the desired overall resistance of the wire. Nickel has the additional characteristic of being ferromagnetic, and therefore its R-F skin depth is still smaller than non-ferromagnetic materials. Accordingly, its R-F resistance is still higher. On the other hand, for the D-C bias currents the nickel has a reasonably small resistance.

The impedance of the coupling spiral (62, 108 or 110) relative to that of the microwave transmission line is always high, and (except at the lowest frequencies) the attenuation is large enough so that the character of the termination (e.g. a short) of the spiral does not affect the impedance level seen looking out from the microwave line. Thus, the use of the conical spiral or helix makes it possible to achieve, in the extremely small available space 22 in the housing, a broadband, substantially reflectionless connection for supplying the bias currents and without absorption thereof. Though the height of the cone 58 is only about 0.4 inch, about 75 turns can be wound on it at a rate of about 200 turns per inch. Each of the turns is almost parallel to the strip-line plane and thus substantially at right angles to the electric field at the strip 50. The cone 58 carries the spiral transmission line 62 vertically away from the strip-line ground plane so that the capacitance to ground decreases as the spiral rises and increases in length, while the inductance and impedance to R-F increase. The conical configuration makes it possible to build up as many turns and as much length as may be required, and by its nature, varies the length per turn of the spiral so that it meanders aperiodically. The cylindrical passage 66 of the grounded top block 26, through which the intermediate cone portion passes, brings the ground plane gradually toward the cone to match with it and remain parallel to it so as to gradually increase attenuation and produce a good termination of the spiral line. The characteristic impedance of the spiral line thereby is reduced, and the attenuation factor (which increases with resistance and inversely with the characteristic impedance) increases.

As explained below, the conical spirals 62, 108, 110, each can be analyzed as a transmission line made up of a single wire. In such a line the electric lines of force originate at one point on the single line and terminate at another point. There is no separate line or ground; the transmission line functions as though the ground were at infinity. For the microwave signals carried by the microstrip line at R-F frequencies, this single-wire line 62 has a high characteristic impedance, but for bias signals at D-C or at lower modulating frequencies (for example, up to 100 megacycles) the wire has a low or moderate impedance. To achieve the high $Z_0$ at high R-F frequencies, a very thin wire (e.g. 1 mil) is provided, since the impedance (or surface resistance) varies inversely as the radius, as explained below. In addition, as also shown below, this surface impedance at the microwave-signal frequencies varies directly as the permeability at those high frequencies of the wire relative to that of free space. Thus a high magnetic permeability wire is provided whose permeability is substantially greater (for example, ten times as great) than the free space permeability, and as high as possible (for example, 100 or more times). This magnetic permeability has the effect of additionally concentrating the microwave signal in a thin layer of the wire; that is, the skin depth of the wire is effectively made very small, and therefore the wire is very lossy at high frequencies.

The effect of an increased length of line (by reason of a conical spiral instead of the straight line in FIG. 5) is that the electrical intensity due to the microwave signal at any point along the line is decreased, which decreased intensity results in a decreased coupling between the microstrip 50 and the conical line 62, so that the microwave current in the line 62 is small. Accordingly, by using a helix, the length of the line can be increased substantially. The spiral helix as a particular form of meandering line has an additional advantage: The component of electrical intensity along each turn of a helix is very much less than the intensity at right angles to the microstrip, due to the shallow lead angle of the helix. In practice, the pitch is made to be about 200 turns per inch, which is about 5 mils per turn (for practical purposes, the pitch is made constant since the machining of support 58 is easier with a constant pitch). The lead angle of the helix is the ratio of the pitch to the radius of the turn, and accordingly, as the diameter of the helical coil becomes greater, the lead angle becomes smaller. In practice, the lead angle is about 5 degrees near the tip, and effective operation can be provided at least up to 10 degrees.

The pitch (that is, the spacing between turns) should not be too small, because the capacitive effects increases with closer turns and bypass effects of the microwave signal may take place. It has been found that for a 1 to 2-mil wire, a 5-mil spacing from center to center of the wire is desirable, but 2-mil spacing may be too close. In the latter case, the effect of the bypass capacitance may become substantial. The coupling of the helix into the microstrip 50 is made at a point where the microwave signal is weakest, i.e. on the top surface of the microstrip ribbon 50 (it is strongest in the opposite direction, along the under surface of ribbon 50 facing ground plane 27). In addition, the diameter of the contact tip 54 should be smaller than the cross-sectional width of the microstrip 52, so that the tip is shielded by the microstrip ribbon 52 from the ground plane 24, and thereby is shielded from the principal microwave field that is formed between the under surface of the ribbon 50 and that ground plane.

From a practical standpoint, the solderless connection of the helical wire 62 to the microstrip 50 is extremely important. The connection, achieved by a spring force applied by C-string 88 to the conical support 58 of the spiral wire, is both simple and effective. The conical opening 68 positions the conical support 58 to locate its extremely small tip 56 (e.g. 0.01 inch) on the small ribbon 50 and also serves as a ground plane shield. The ground plane shielding of the helical line 62 by passage through the opening 66, 68 in grounded cover 26, insures freedom from spurious responses due to the various modes that can propagate along such a helical line. The shielding insures that conditions suitable for the propagation of the higher order modes are not satisfied over the operating frequency range. Thus the shielding preserves the character of the single-wire line as one which propagates a surface wave having circular magnetic lines. Due to the shielding, the helix 62 within opening 68 may operate in the TEM mode rather than the surface-wave mode with circular magnetic lines. However, this is without harmful effect. Only a portion of the coil is shielded, and a portion is unshielded (about one-third of the height of the helix), in order to keep the cover ground plane 23 as far away as possible from the microstrip ribbon 50; and the fully shielded portion also seems to be effective in preventing propagation of other modes than the desired surface-wave mode. In order to prevent undue reflections produced by a transition from the unshielded portion of the helix to the shielded portion, the shield opening is formed with a cylindrical section 66, so that the conical spiral approaches it gradually, to provide a smooth transition.

The conical dielectric support 58 is provided with deep V-shaped grooves so that the uninsulated wire 62 seats therein with a substantial spacing from the conical ground plane opening 68. This spacing avoids any shorting of the insulated wire. In addition, due to the dielectric constant of the conical support 58, and the deep embedding of the wire within that support so that most of the electric field is located within the dielectric, the effective length of the helical line is made substantially greater. This helix involves some 24 inches of wire. This conical spiral bias line is especially useful in its application to the above described attenuator, but it is not limited thereto and can be used for coupling into any radio-frequency device; for example, where it is desired to supply electrical energy for modulation. Thus, if one wanted to modulate up to 100 megacycles to achieve a 10-nanosecond response, this conical spiral line would provide a suitable transmission line for that purpose, although there would be some loss of the modulating signal due to the substantial resistance of the spiral. This spiral line is especially useful for coupling into microwave devices of very small dimension, as in the microstrip attenuator described above.

The difference between this device and a high frequency choke or coil should be noted. Such chokes are closely wound, insulated wires, but they act as a metallic sheath due to the interwinding capacitance at high frequencies, and their operation is unpredictable when used to couple into a microwave line handling frequencies above 100 megacycles.

The propagating space 22 in housing block 12 is generally in the form of a rectangular U cross-section (as indicated in FIG. 5) formed by the walls of block 12 (in the center region, stud 24 forms the bottom wall of the U). Thus, the walls of this U-shaped space 22 are in the nature of a "trough" ground plane, in which a metallic ribbon or microstrip 50 extends along the bottom length of the trough and is spaced by a dielectric from the bottom wall of the trough and is remotely and equally spaced from the vertical walls on either side. In this construction, the dimensions are chosen to form a transmission line propagating in the TEM mode; such a transmission line may be called a "trough line." This trough line construction of the present invention is provided with a cover ground plane in the form of the lower face 23 of member 26, which forms a rectangular waveguide with the side and bottom walls of the trough and extends therealong for the length of propagating space 22. This top ground plane 23, as described above, is sufficiently remote from the microstrip 50 as to have negligible effect on the microwave signals, and also provides a shield and ground plane for the upper portion of the spiral line 62 in its transition from a single-wire transmission line.

This hollow waveguide construction formed by the cover ground plane 23 and the trough is designed to control the spectrum of the next propagating mode. That is, the dimensions of the trough space 22 (formed by the side walls of block 12, the upper face of stud 24, and face 23) are chosen so that the resulting hollow waveguide cannot propagate a rectangular waveguide mode up to the highest operating frequency of the microwave attenuator (e.g. 18 gHz). The unit is thereby designed so that the highest operating frequency which the attenuator microstrip line is designed to propagate is effectively below the frequency of any hollow waveguide mode that the closed trough line can propagate within its walls as a hollow waveguide. Thus, the trough line is limited to propagation of the single TEM mode for which it is designed. The rectangular shape of the hollow waveguide has some advantages over other shapes (e.g. circular) in that in the former there is a larger spacing of the next higher modes so that the waveguide dimensions can be chosen to exclude more effectively such higher modes from propagation.

The single-wire continuous transmission line formed by spiral 62 functions as a very compact miniature low pass filter which above cut-off frequency maintains a high input impedance, relative to that of the 50-ohm transmission line, over the extreme frequency range of 100 mc. to 18 gHz., and has a moderately low impedance in the low pass region. This single-wire line operates in a single mode over the frequency range of interest, so that no lumped or periodic discontinuities are introduced, a condition which assures a generally smooth behavior over the entire frequency band. Furthermore, it provides a natural way of making connection to the signal conductor strip of a microwave line, such as the above described attenuator, without introducing other ground connections.

A consideration of the spiral coupling 62 in terms of the characteristics of a single wire transmission line may be helpful. As discussed by Stratton in "Electromagnetic Theory," McGraw-Hill, 1941, pp. 524–537, the surface wave of interest is the symmetric $n=0$ mode which is a TM mode, with the magnetic field being entirely transverse to the axis of the wire. This mode has the lowest attenuation of all modes and is the only one which survives after some small initial distance from the point of excitation. The surface impedance $Z_s$ is by definition the ratio of the axial component of the electric field at the surface of the wire and the total current flowing in it.

Accordingly, the surface impedance $$Z_s=\frac{\text{volt/length}}{\text{amp}}$$

is expressed in ohms per unit length of line. If the depth of penetration $d$ is small compared to the radius of the wire, then the surface impedance is approximately given by $$Z_s=\frac{1.33}{a}(P_rS_rf)^{1/2}(1+j)\text{ ohms/inch} \qquad [1]$$

where $a$=radius of wire in mil
$P_r$=relative permeability (at $f$)
$S_r$=relative resistivity of copper
$f$=frequency in gHz.

At the low frequencies, where the skin depth becomes large relative to the radius of the wire, Equation 1 does not apply. In this case, $Z_s$ reduces to the D-C resistance of the wire. Thus, at the high frequencies, where this equation applies, it is seen that $Z_s$ is complex; in fact, that it is inductive, the inductive reactance per unit length being equal to the resistance per unit length. Inspection of Equation 1 shows that $Z_s$ increases inversely with $a$, and is proportional to the square root of $P_r$, $S_r$, and $f$. Thus, if it is desired to make $Z_s$ large, one should make $P_r$ as large as possible, since this quantity does not enter into the D-C resistance and thus makes for an efficient design. With respect to the choice of $S_r$ and $a$, it is seen that $$Z_s\simeq(Sa^2)^{1/2}\simeq R_0^{1/2}$$

is proportional to the square root of the D-C resistance $R_0$, so that an increase in $Z_s$ via these parameters will also increase the D-C resistance, but with relatively minor effect on the bias signals. Thus, for instance, a copper wire 1 mil in diameter at 300 mc. has a surface impedance $Z_s$ of slightly over 2 ohms per inch, whereas nickel wire with $P_r$ about 150 and $S_r$ equal to 4.55, has a surface impedance $Z_s$ of about 54 ohms per inch, and a D-C resistance of 3.9 ohms per inch. The use of Equation 1 is justified since $d$, the skin depth, for the assumed values turns out to be $d$=0.026 mil, which is very much less than $a$=0.5 mil.

Figure 6:
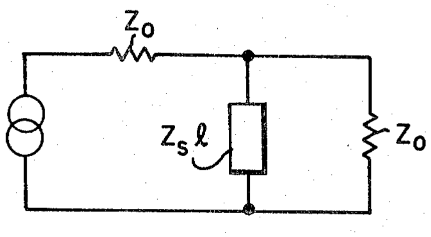
FIG. 6 is an idealized equivalent circuit diagram used in the explanation of this invention.

In the simplified cross-sectional diagram of FIG. 5, it is assumed that over the frequency range of interest, no mode other than the TEM mode can propagate inside the space bounded by the grounded walls of 12′, 23′ and 24′. Representation of the effect of the loading of the single wire 122 on the microstrip 50′ may be difficult to present rigorously for although the homogeneous solution for the single-wire line 122 (i.e. the characteristics of the freely propagating mode along an axial cylinder) is known, the counterpart for a single-wire line immersed in an external RF microwave field as in FIG. 5 is not known. Nevertheless, there are some important deductions that can be made. At low frequencies where the length of the wire line 122 is very small relative to wavelength of the microwave frequencies, the current in wire 122 is substantially uniform. Evaluating the line integral of the electric intensity E along the line 122 from the strip 50′ to ground 120′, one obtains $$\varphi AB=\int_A^B \overline{E}\cdot\overline{ds}=\int_A^B Z_s\overline{i}\cdot\overline{ds}=Z_sil \qquad [2]$$

where $l$ is the length of the line 122. Since the field is Laplacian in the cross-sectional plane of FIG. 5, $\varphi$AB is the voltage between the strip 50′ and ground 120, and thus, for this condition, the equivalent circuit of FIG. 6 is applicable, where the characteristic impedance of the microstrip and the matched generator 92 are each represented by $Z_0$ and the shunting impedance of wire 122 is represented by $Z_sl$. The insertion loss L(db) under the above conditions is given by $$L(\text{db})=20\log_{10}\left|\frac{1+Z_s'l}{2Z_s'l}\right| \qquad [3]$$

where $Z_s'$ is the normalized (to $Z_0$) surface impedance per unit length; which is the result that should be obtained as the D-C conditions are approached. Over the range where Equation 3 applies, small insertion losses can only be obtained if $|Z_s'|l>>|$. However, in view of the above-noted impedance values obtained with copper and nickel, which is feasible if $l$ is made very much larger than the cross-sectional dimension. But this design of wire 122 was predicated on the validity of the equivalent circuit of FIG. 6, which now comes into question inasmuch as the shunting impedance $Z_sl$ cannot be treated as a lumped element, but must be treated as a distributed transmission of length $l$ terminated in a short circuit. The finding that by increasing the length of the single wire, one path reduces its loading effect on the 50-ohm transmission line may be explained by the coupling to the surface wave being correspondingly decreased. Since the amplitude of the induced surface wave is proportional to the unperturbed electric field intensity of the external microwave field along the initial path of wire 122, it follows that by covering the same vertical distance in FIG. 5 from strip 50′ to some intermediate point via a longer path thus permitting the unperturbed field to intersect this path more closely at right angles, the initial $E_s$, and thus the coupling to the surface wave, is reduced. Although the circuit of FIG. 6 is not directly applicable at the higher frequencies, it nevertheless gives qualitatively the correct dependence, i.e., the coupling to the surface wave is properly expressed by the product of $Z_sl$. If $|Z_sl|>>Z_o$ (50 ohms), the attenuation along this line is sufficiently large so that the termination at ground 120 is unimportant. However, at the lower frequencies, below 500 mc., and using about 20 inches of wire length, the reflections cannot be ignored. The energy of the surface wave is carried in the electric field space surrounding the wire, and thus, if the line is conductively or capacitatively connected (an effective R-F short) to a metallic surface at ground 120, the wave is fully reflected at this point. Consequently, the external (external to the wire) impedance of the surface wave $Z_z=E\gamma H_\theta$ in the propagating direction at point 56′ (where $z$, $r$ and $\theta$ are the cylindrical coordinates) increases as the frequency is approcahed where the line length $l$ equals a quarter-wavelength and decreases as the frequency is approached where $l$ equals a half-wavelength. Since the surface current $I_s$ in the propagating direction is directly proportional to $H_\theta$ at the surface, it is clear that the current loading of the line at the microstrip 50′ must go through these same variations. Consequently, one should expect increased loading effects at frequencies where $l$ is an integral number of half-wavelengths, and decreased loading where $l$ is an odd number of quarter-wavelengths. However, as previously mentioned, since $Z_s$ increases with frequency, the line attenuation increases so that these variations tend to disappear. Experimental results show, in fact, that the disappearance of these higher resonances is more rapid than would be expected on the basis of the increase in $Z_s$ treated as a transmission line. This may be due to the fact that the external field, which in the cross-sectional plane is in equiphase, is getting more out of phase with the propagating surface wave as the frequency increases. Thus, it is reasonable to assume that only an initial fixed electrical length, probably less than $\pi/2$, is responsible for launching the surface wave. Since this length is inversely proportional to the frequency, it is seen that the current loading due to this effect and $Z_s$ should at the higher frequencies vary as $f^{-3/2}$ rather than $f^{-1/2}$.

The length of coupling wire 122 can be increased beyond the internal dimensions so as to allow only the surface wave to propagate and to launch this wave in such a way as to bring the full length of the line into play. In the case of the conventional coaxial structures, this may be accomplished by constructing the line in the form of an Archimedes spiral (as shown and described in the aforementioned paper of applicant, here incorporatet by reference). In this way, the electric intensity $E_s$ is reasonably well distributed over the length of the spiral, so that the external field intersects the spiral more and more at right angles. Experimental results indicate that over the frequency range where the coaxial line operates in the TEM mode alone, the spiral tends to operate in the surface mode alone, particularly if the pitch of the spiral is equal to about five wire diameters. In a stripline construction, a spiral coupling line is not preferred because of the desired electric field configuration and the miniature dimensions of the microstrip line. The conical spiral, as discussed above, has been found to be fully suitable.

Various other modifications of this invention will be apparent from the above description and the illustrated embodiments. For example, instead of a solid spiral wire 62, thin films of high resistance (such that the surface impedance becomes purely resistive) may be used where the bias currents are small. Such thin films may be deposited in the spiral groove of a conical dielectric support such as the cone 58. Also, more than two shunt diodes may be used.

Thus, a new and improved variable microwave attenuator, using PIN diodes connected in series and shunt relation, is provided by this invention, and which can be fabricated in extremely small size to achieve a wideband operation. Extremely small chips (or a solid block) of PIN diodes are used and assembled in a microstrip transmission line structure which is compact, suitable for manufacture, and effective in operation. The microstrip is constructed to have the same characteristic impedance as the remainder of the unit (e.g. as the input and output connectors) to be matched with that of a microwave source and load, whereby wideband performance is achieved. The diode chips may have extremely small dimensions (e.g. 0.02 inch or less) and a T-Pi configuration may be employed in which two shunt diodes are connected by a conductor of a length about an eighth or a quarter wavelength at the highest microwave operating frequencies. A wideband conically spiral coupling device is effective to supply low frequency bias currents to a compact structure such as a microstrip without impairing the operation at microwave frequencies. The overall unit is designed to operate over a wide band of microwave operating frequencies including multi-gigahertz, and a generally flat response characteristic is achieved over that band. A closed trough line structure in the form of a hollow waveguide is provided for enclosing a TEM microstrip line having a coupling line connected thereto, and the structure is so dimensioned as to restrict propagation to the single TEM mode.

What is claimed is:

1. A microwave device comprising:

input and output means;

a first substantially planar conductive element;

second, third and fourth substantially planar conductive elements spacedly mounted from each other and from said first conductive element and generally parallel to the plane of said first conductive element;

semiconductor means mounted between opposing planar surfaces of said first conductive element and the others of said conductive elements and forming three separate conductive paths between said first element and each of said other elements;

and means for selectively applying bias signals to said conductive elements and for connecting said conductive elements in a network with two of said conductive paths associated with said second and fourth elements in series relation with said input and output means and the third of said paths associated with said third element in shunt with said input and output means.

2. A microwave device as recited in claim 1 wherein said second, third and fourth elements are mounted substantially in a common plane.

3. A microwave device comprising:

a first substantially planar conductive element;

second, third and fourth substantially planar conductive elements spacedly mounted from each other and from said first conductive element and generally parallel to the plane of said first conductive element;

semiconductor means mounted between opposing planar surfaces of said first conductive element and the others of said conductive elements and forming separate conductive paths between said first element and each of said other elements;

means for selectively applying bias signals to said conductive elements and for connecting said conductive elements in a network with said conductive paths in series and shunt relationships;

and microwave input and output means having separate signal and ground conductors, said third element being coupled to the ground conductor of said input and output means, and said second and fourth elements being respectively coupled to the signal conductor of said input and output means, whereby a conductive path between said first and third elements is in shunt relation to others of said conductive paths.

4. A microwave device as recited in claim 3 wherein said semiconductor means includes PIN diode material.

5. A microwave device as recited in claim 4 wherein said PIN diode material is in the form of a block extending to said second, third and fourth elements.

6. A microwave device as recited in claim 4, and further comprising means for supplying signals to certain ones of said elements to bias said PIN diode material, whereby said device is operable as an attenuator.

7. A microwave device as recited in claim 6 wherein said PIN diode material is in the form of a block of semiconductor material extending to said second, third and fourth elements.

8. A microwave device as recited in claim 6 wherein said PIN diode material between said first and third elements has separate portions that form two conductive paths between said first and third elements; wherein said device is characterized by a certain band of operating frequencies including gigahertz; said third element is connected to said input and output means as a ground plane; said first element includes a part connected between said spaced PIN diode portions and substantially uniform over its length and lossless at low ones of said operating frequencies, said first element part being of substantial length so as to maintain said line characteristic impedance at high ones of said operating frequencies and with said two conductive paths in different impedance operating states.

9. A microwave device as recited in claim 6 wherein said input and output means have a characteristic impedance; and said bias means includes a coupling conductor directly connected to said first element and having an aperiodic meander and a resistance at microwave operating frequencies at least ten times said characteristic impedance.

10. A microwave device as recited in claim 6 wherein said bias means includes a coupling conductor wound in the form of a conical spiral about an axis transverse to the plane of said first element and directly connected thereto.

11. A microwave device as recited in claim 6 wherein said PIN diode material is in the form of individual chips respectively associated with said second, third and fourth elements.

12. A microwave device as recited in claim 11 wherein said chips are aligned.

13. A microwave device as recited in claim 4 wherein said PIN diode material is in the form of individual chips.

14. A microwave device as recited in claim 13 wherein said chips are aligned.

15. A microwave device as recited in claim 13 wherein two of said chips are mounted between said first and third elements and are assembled in a line transverse to a line between two of said chips respectively mounted between said first and said second and fourth elements.

16. A microwave device comprising:

a first substantially planar conductive element;

second, third and fourth substantially planar conductive elements spacedly mounted from each other and from said first element and generally parallel to the plane of said first element;

semiconductor means including PIN diode material mounted between opposing planar surfaces of said first conductive element and the others of said conductive elements and forming separate conductive paths between said first element and each of said other elements;

microwave input and output means of characteristic impedance and having separate signal and ground conductors;

said third element being coupled to the ground conductor of said input and output means, said second and fourth elements being respectively coupled to the signal conductor of said input and output means, whereby a conductive path between said first and third elements is in shunt relation to others of said conductive paths, said first and third elements forming a TEM strip transmission line with the PIN diode material as dielectric therebetween, and with a characteristic impedance substantially the same as that of said input and output means;

and means for supplying signals to certain ones of said elements to bias said PIN diode material, whereby said device is operable as an attenuator.

17. A microwave device as recited in claim 16 wherein a ground plane is connected to said third element and the ground conductor of said input and output means; said second and fourth elements are spaced from said ground plane by a dielectric material having good thermal conductivity, whereby heat energy in said PIN diode material between said first and second and fourth elements is effectively dissipated to said ground plane element.

References Cited

UNITED STATES PATENTS

| | | | |
|---|---|---|---|
| 3,223,947 | 12/1965 | Clar | 333—7 |
| 3,295,138 | 12/1966 | Nelson | 333—31 UX |
| 3,453,564 | 7/1969 | Russell | 333—81 |
| 3,503,015 | 3/1970 | Coraccio et al. | 333—7 |
| 3,518,585 | 6/1970 | Wilcox | 333—81 |
| 3,105,922 | 10/1963 | Fukui et al. | 317—234 W |
| 3,487,272 | 12/1969 | Siebertz et al. | 317—234 W |
| 3,597,706 | 8/1971 | Kibler | 333—7 |

PAUL L. GENSLER, Primary Examiner

U.S. Cl. X.R.

307—237; 333—84 M, 97 R